United States Patent
Kolling

(10) Patent No.: US 6,942,828 B2
(45) Date of Patent: Sep. 13, 2005

(54) METHOD AND APPARATUS FOR MANUFACTURING A TOOTHED BELT

(75) Inventor: Rudi Kolling, Vlotho (DE)

(73) Assignee: Breco-Antriebstechnik Breher GmbH & Co. (DE)

(*) Notice: Subject to any disclaimer, the term of this patent is extended or adjusted under 35 U.S.C. 154(b) by 235 days.

(21) Appl. No.: 10/368,110

(22) Filed: Feb. 14, 2003

(65) Prior Publication Data

US 2003/0173192 A1 Sep. 18, 2003

(30) Foreign Application Priority Data

Feb. 16, 2002 (DE) .......................... 102 06 510

(51) Int. Cl.$^7$ .............................................. B29C 47/02
(52) U.S. Cl. .................. 264/162; 264/167; 264/171.11; 264/271.1
(58) Field of Search .............................. 264/162, 167, 264/264, 271.1, 317, 318, 280, 177.17, 171.13, 171.11; 425/224, 373, 115

(56) References Cited

U.S. PATENT DOCUMENTS

| 1,481,866 | A | * | 1/1924 | Heist ........................... 156/199 |
| 2,865,046 | A | * | 12/1958 | Bird ........................... 264/46.3 |
| 3,210,447 | A | * | 10/1965 | Cyr et al. ................... 264/46.3 |
| 3,312,583 | A | * | 4/1967 | Rochlis ........................ 428/88 |
| 3,880,558 | A | * | 4/1975 | Breher et al. ................ 425/115 |
| 3,999,914 | A | * | 12/1976 | Breher et al. ................ 425/114 |
| 4,066,732 | A | * | 1/1978 | Redmond, Jr. .............. 264/229 |
| 4,198,875 | A | | 4/1980 | Schneider |
| 4,343,666 | A | * | 8/1982 | Wetzel ........................ 156/138 |
| 4,395,298 | A | * | 7/1983 | Wetzel et al. ................ 156/137 |
| 4,448,621 | A | * | 5/1984 | Marsh et al. ................ 156/138 |
| 4,486,375 | A | * | 12/1984 | Hirai ........................... 264/254 |
| 4,515,743 | A | * | 5/1985 | Breher ......................... 264/135 |
| 4,755,334 | A | * | 7/1988 | Grimm et al. .............. 264/40.7 |
| 5,534,217 | A | * | 7/1996 | Thomas et al. .............. 264/516 |
| 6,358,030 | B1 | * | 3/2002 | Ampulski ..................... 425/115 |
| 6,491,157 | B1 | * | 12/2002 | Kolling et al. .......... 198/867.11 |
| 6,554,601 | B2 | * | 4/2003 | Ampulski et al. ........... 425/503 |
| 6,609,770 | B2 | * | 8/2003 | Gauthier ...................... 305/167 |
| 6,838,040 | B2 | * | 1/2005 | Mlinar et al. ................ 264/504 |

* cited by examiner

*Primary Examiner*—Mark Eashoo
(74) *Attorney, Agent, or Firm*—Blakely, Sokoloff, Taylor & Zafman

(57) ABSTRACT

The toothed belt is produced in a moulding cavity, which is defined by a rotating moulding wheel and an endless moulding belt, which is also rotating. For this purpose, the moulding wheel has a channel defined by lateral cheeks, in the base of which are provided recesses, which correspond to the teeth of the toothed belt. The moulding belt surrounds the moulding wheel over a proportion of its periphery and engages the lateral cheeks at that point. The polyurethane, of which the toothed belt is to consist, is injected into the inlet of the moulding cavity. Upstream of the inlet, "lost cores" are introduced into some of the recesses in the moulding wheel corresponding to the teeth in such a manner that they are embedded all around in the polyurethane. After finishing the toothed belt the "lost cores" can be removed. Passages remain which can be used, for instance, for mounting fastening elements.

8 Claims, 2 Drawing Sheets

METHOD AND APPARATUS FOR MANUFACTURING A TOOTHED BELT

FIELD OF THE INVENTION

The invention relates to a method and an apparatus for manufacturing a toothed belt and is directed further to the toothed belt itself.

DESCRIPTION OF THE PRIOR ART

Toothed belts nowadays find many applications, whether for pure force transmission, for control purposes or for the transport of workpieces from one processing station to another. They comprise elastomeric material, preferably polyurethane, and include a reinforcing insert extending along their length, particularly in the form of wire strands, which increases the tensional strength and thus the shape stability in the longitudinal direction.

It was previously necessary to subject the toothed belts, after their fabrication, to expensive processing steps in order to match them to the respective intended use.

It is the object of the invention to design the manufacture and structure of the belt such that subsequent processing steps are at least simplified, if they are not rendered completely superfluous.

SUMMARY OF THE INVENTION

In order to solve this object, the invention provides a method in which a moulding cavity with an inlet and an outlet is defined between a rotating moulding wheel which, in its periphery, has an annular channel defined by lateral cheeks, and an endless moulding belt, which also rotates and surrounds a proportion of the periphery of the moulding wheel and engages its lateral cheeks at that point, the moulding wheel being provided in the base of its channel with recesses, the shape of which corresponds to the shape of the teeth of the toothed belt, a mouldable and solidifiable plastic material is introduced into the inlet of the moulding cavity and "lost cores" are introduced into the moulding cavity upstream of its inlet, which extend at least transversely over the breadth of the channel in the moulding wheel from lateral cheek to lateral cheek such that, in at least some of the recesses in the moulding wheel, they are embedded all around in the plastic material of the toothed belt over at least a proportion of their length.

In this manner, there is the possibility of designing the teeth of the toothed belt in a simple manner matched to the respective intended use. This can be effected with the tools currently available. The "lost cores" have a positive additional effect, since they stabilise the toothed belt in the transverse direction. This prevents the so-called "bowl effect", namely the concave warping of the rear side of the toothed belt, which can otherwise occur if the toothed front side is provided with a textile overlay, which has an influence on the shrinkage characteristics of the toothed belt material.

There is basically the possibility of providing each tooth of the toothed belt with a "lost core". It is generally sufficient to provide the "lost cores" at a uniform, relatively large spacing over the length of the toothed belt.

Each "lost core" produces a cavity in the associated tooth which can be used in different manners.

The "lost cores" are preferably pushed in the form of bars through openings opposite to one another in the lateral cheeks of the moulding wheel. They produce a passage of preferably circular cross-section. During the injection of the plastic material into the moulding cavity, they remain fixed in position by virtue of their engagement in the lateral cheeks of the moulding wheel.

As an alternative, it is proposed that the "lost cores" are inserted into the moulding cavity and are supported in the recesses in the moulding wheel with at least two respective webs, which extend over the height of the moulding cavity. In this case, the webs are responsible for fixing the "lost cores" in position, whereby they absorb the extrusion pressure.

The "lost cores" are advantageously fitted into the recesses in the moulding wheel with at least two of their webs. This results in an absolutely precise positioning of the "lost cores".

It is also advantageous if the "lost cores" are positioned with a respective one of their webs against each lateral cheek of the moulding wheel. Recesses are produced in this manner in the material of the toothed belt at the lateral edges of the teeth. Furthermore, the lateral ends of the "lost cores" are supported. If it is the webs at that point, which are fitted into the recesses in the moulding wheel, that is to say whose shape corresponds to these recesses, namely the tooth shape, the precise positioning of the "lost cores" takes place at their lateral ends. It is preferred that at least one third web, arranged in the central region, is used, which extends through a region of the toothed belt, in which no reinforcing insert is provided. This central web need not be used for positionally fixing the associated "lost core". It can therefore be of any desired shape, but with the proviso that it extends from the crown surface of the associated tooth to the rear side of the toothed belt.

The webs of the "lost cores" are preferably connected to one another by rod-shaped sections, the latter preferably having a circular cross-section.

In an important embodiment of the invention, it is proposed that the "lost cores" are manufactured from a brittle material, which does not bond with the plastic material of the toothed belt. This provides the possibility of removing "lost cores" from the toothed belt after the setting of the latter.

If the "lost cores" are pushed in the form of bars through the opposing openings in the lateral cheeks of the moulding wheel, the necessity of ejecting the rods, before demoulding the toothed belt, in its transverse direction disappears. Instead, the laterally mounted ends of the rods can simply be broken away during the demoulding process. The remainder of the rods may subsequently be ejected if it is wished to use the passages produced thereby. If, however, one is concerned only with preventing the "bowl effect", the remainder of the bars can remain in the material of the toothed belt.

One possible use for the passages resides, for instance, in anchoring workpiece carriers, which are clamped against the untoothed rear surface of the toothed belt. The anchoring elements passing through the passages can advantageously be constructed in the form of predetermined breaking points, which protect the toothed belt from overloading if one of the workpiece carriers or some other anchored element is subjected to an impermissible force. The passages can also be closed on one side and open via channels to the rear side of the toothed belt. If the unclosed end of the passages is then connected during operation to a vacuum source, a suction effect can be produced on the rear side of the toothed belt, optionally via suction cups, which is suitable for holding workpieces on the smooth surface of the toothed belt.

If the "lost cores" are provided with webs, these extend from the crown surface of the associated teeth to the rear side of the toothed belt. As a result of the brittleness of the material, it is sufficient to exert a force on the webs and thus to break the connection with the bodies of the "lost cores" in the passages. The bodies in the passages, which, as mentioned, are preferably bars with a circular cross-section, can then be ejected transversely to the toothed belt, as soon as the webs have been ejected perpendicular to the transverse direction.

If the webs are situated at the lateral ends of the "lost cores" recesses are formed here, preferably with the profile of the teeth. Corresponding webs of fastening elements, which are used, for instance, for transporting workpieces, can engage in these recesses. The anchoring of these fastening elements is effected by means of a screw, which extends through the passage produced by one of the "lost cores".

The "lost cores" provided with webs can also remain in the material of the toothed belt, for instance in order to prevent the "bowl effect". It is also particularly advantageous to manufacture these "lost cores" from a material whose sliding properties are better than those of the plastic material of the toothed belt. When the cooled plastic material of the toothed belt shrinks, the dimensions of the "lost cores" do not decrease so that the webs project slightly out of the tooth crowns. Since a material is selected for the "lost cores", which has better sliding properties than the plastic material of the toothed belt, the toothed belt obtains an increased sliding ability on its tooth side and optionally also on its side edges. A particularly suitable material for this purpose is, for instance, Teflon.

In any event, it is advantageous to grind the untoothed rear side of the solidified toothed belt to size. This smooths not only the surface but also ensures, above all, that the passages, which are produced by the "lost cores" and extend over the breadth of the belt, maintain a predetermined spacing from the rear surface of the toothed belt. This is of considerable significance for the exact positioning and clamping of the fastening elements to be connected to the rear side of the toothed belt. Furthermore, the webs of the "lost cores" are freed from a plastic skin produced by over-extrusion.

In order to solve the object posed, the invention further provides an apparatus for manufacturing a toothed belt including
  a rotating moulding wheel which has an annular channel, which is defined by lateral cheeks, the base of the channel being provided with recesses, the shape of which corresponds to the shape of the teeth of the toothed belt,
  an endless moulding belt, which also rotates and surrounds a proportion of the periphery of the moulding wheel to define a moulding cavity with an inlet and an outlet and at that point engages its lateral cheeks,
  a plastic material injection device arranged at the inlet of the moulding cavity and
  a device arranged upstream of the inlet of the moulding cavity for introducing "lost cores" into at least some of the recesses in the moulding wheel.

It is particularly advantageous if the lateral cheeks of the moulding wheel have openings, which are opposite to one another, and if the device for introducing "lost cores" has an insertion device for inserting a respective rod-shaped "lost core" into two opposite openings.

Alternatively, it is proposed that the device for introducing "lost cores" has an insertion device for preferably radially inserting a respective "lost core", provided with webs, into a recess in the moulding wheel.

In order to solve the object posed, the invention finally provides a toothed wheel of plastic material with a "lost core" in at least one of its teeth, the "lost core" extending over the breadth of the toothed belt and being embedded all around in the plastic material of the toothed belt over at least a proportion of its length.

The "lost core" is preferably rod-shaped, whereby it has, in particular, a round cross-section.

Alternatively or additionally, the "lost core" is preferably provided with at least two webs, which extend from the crown of the associated teeth to the rear surface of the toothed belt, whereby it is further proposed that at least two of the webs are matched to the tooth shape.

The "lost core" preferably has a web at each of its lateral ends, whereby these lateral webs are preferably matched to the tooth shape. The recesses produced in the material of the toothed belt thus correspond in their shape to the tooth cross-section.

If the "lost core" consists, as is particularly advantageous, of a brittle material, which does not bond with the plastic material of the toothed belt, the "lost core" may be readily removed after setting of the plastic material of the toothed belt and, if it is in the form of a simple rod, leaving behind a continuous opening, which can be used for the application of reduced pressure by suction cups arranged on the rear side of the toothed belt or for receiving anchoring means for fastening elements.

If the "lost core" remains in the finished toothed belt, it preferably consists of a material, whose sliding properties are better than those of the plastic material of the toothed belt. The webs of the "lost core" then project, on cooling, slightly out of the tooth crowns and optionally out of the side edges of the toothed belt and can increase the sliding ability of the toothed belt.

The untoothed rear side of the toothed belt is advantageously ground to size.

In one embodiment of the invention, the toothed belt is characterised by at least one fastening element, which extends transversely over its untoothed rear side and, after removal of the "lost core" engages with two webs matched to the tooth shape into the lateral recesses in the associated tooth and is retained by a screw, which passes through the tooth and connects the webs. An extremely loadable and extremely precise mounting is produced for transporting workpieces or for performing actuating functions.

The screw or a different type of corresponding anchoring element can be constructed in the form of a predetermined breaking point in order to protect the toothed belt from overloading.

The invention will be explained in more detail below by way of preferred exemplary embodiments in conjunction with the accompanying drawings.

DESCRIPTION OF THE PREFERRED EMBODIMENTS

Figure 1:
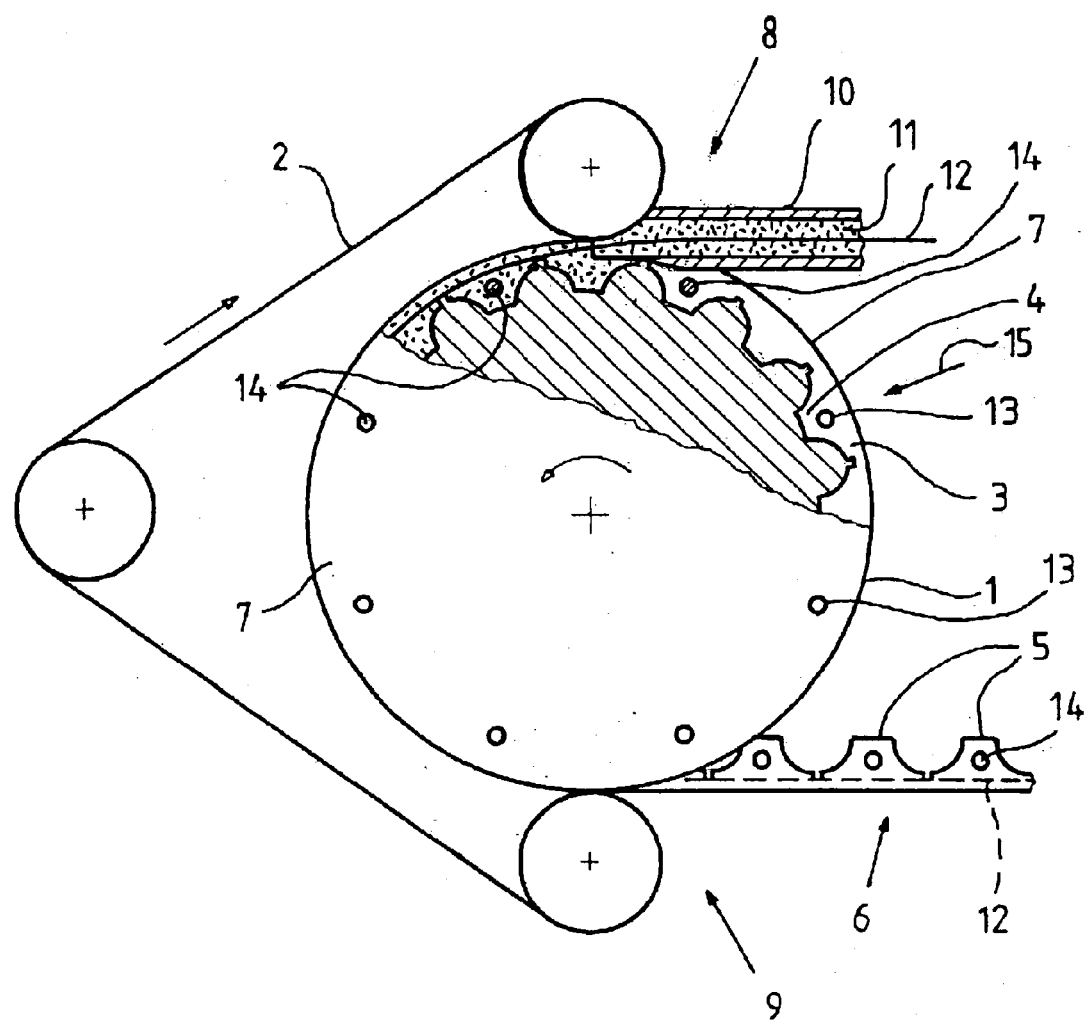
FIG. 1 is a section through a schematic view of an apparatus in accordance with the invention.

The apparatus shown in FIG. 1 has a rotating moulding wheel and an endless moulding belt, which is also rotating, the moulding belt being wrapped around a portion of the periphery of the moulding wheel 1. Formed in the periphery of the moulding wheel 1 is an annular channel 3, the base of which is provided with recesses 4. The shape of the recesses is matched to the shape of the teeth 5 of a toothed belt 6 which is to be manufactured. The channel 3 is defined by lateral cheeks 7, on which the moulding belt 2 rests in the wrap-around region. In this wrap-around region, a hollow moulding cavity is defined by the moulding wheel 1 and the moulding belt 2, which cavity has an inlet 8 and an outlet 9.

Provided at the inlet 8 of the moulding cavity is an extruder 10, which injects polyurethane 11 into the moulding cavity. At the same time, a reinforcing insert 12 enters the moulding cavity.

The lateral cheeks 7 of the moulding wheel 1 are provided with openings 13 opposed to one another. The distribution is such that a pair of openings 13 is associated with every second tooth 5 of the finished toothed belt 6, that is to say with every second recess 4 in the moulding wheel 1. Different associations are of course equally possible.

At a position upstream of the inlet 8 of the moulding cavity, rod-shaped "lost cores" 14 are pushed in from the side into a respective pair of opposing openings 13. This is effected by an insertion device, which is not shown. The "lost cores" 14 bridge the moulding cavity and are completely embedded in the polyurethane 11 in the course of the moulding process. They consist of a brittle material, which does not bond to the polyurethane. When finishing the moulding of the toothed belt 6, that is to say at the outlet 9 of the moulding cavity, the sections of the "lost cores" 14 situated laterally in the cheeks 7 are broken off, whereafter the latter can be ejected laterally out of the teeth 5. Passages, which extend transversely through the teeth 5 and can be used for connecting to a vacuum source or for receiving fastening means for fastening elements to be arranged on the rear side of the toothed belt 6 are thus produced, without additional processing steps being necessary.

Instead of the insertion device, an embedding device 15 can also be provided, which is indicated schematically in FIG. 1 by an arrow. The embedding device serves to insert differently constructed "lost cores" 16 radially into the recesses 4 in the moulding wheel 1.

Figure 2:
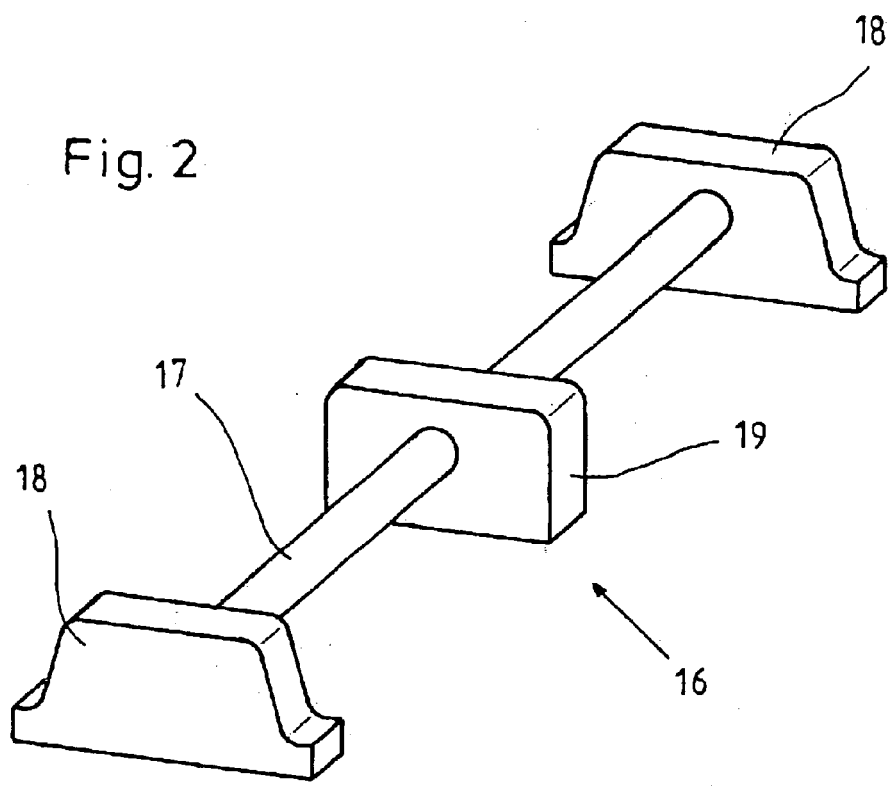
FIG. 2 is a perspective view of a "lost core"

One of these "lost cores" 16 is illustrated in FIG. 2. It has a rod-shaped body 17, which is provided with two lateral webs 18 and a central web 19. All the webs 18, 19 extend over the full height of the moulding cavity, whereby they are accessible in the finished toothed belt 6 from the surface of the tooth crests, on the one hand, and from the surface of the rear side of the toothed belt, on the other hand.

The "lost cores" 16 also comprise brittle material, which does not bond with the polyurethane of the toothed belt. By virtue of the action of force on the central web 18, its connection on both sides to the central body 17 can be broken, whereafter the entire "lost core" 16 may be removed from the associated tooth 5 of the toothed belt 6.

The "lost cores" 16 can also remain in the toothed belt 6. They then consist, for instance, of Teflon, the sliding properties of which are better than those of the polyurethane. After cooling, the webs 18, 19 constitute sliding elements on the toothed side and on the side edges of the toothed belt 6.

As may clearly be seen in FIG. 2, the shape of the lateral webs 18 is matched to the shape of the teeth 5 of the toothed belt 6. When the "lost core" 16 is inserted, the webs 18 thus ensure very precise positioning. They also produce corresponding recesses in the flanks of the toothed belt, as is clearly apparent in FIG. 3.

Figure 3:
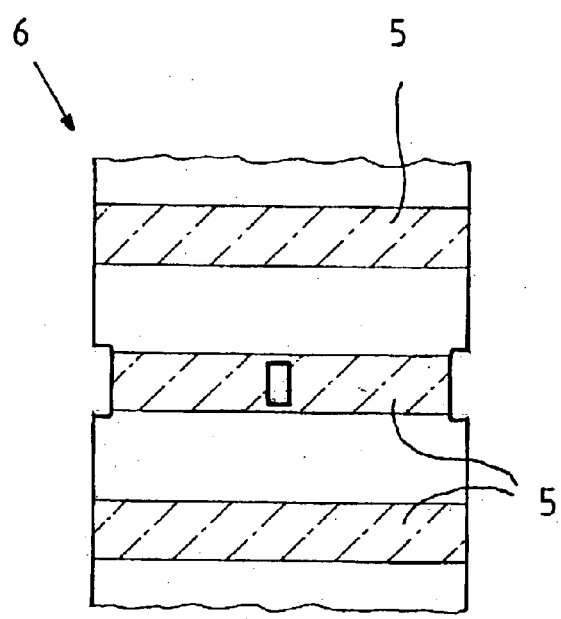
FIG. 3 shows the outline of a section of a toothed belt, which has been manufactured using "lost cores" shown in FIG. 2.

The crown surfaces of the teeth 5 are shown in chain-dotted lines in FIG. 3 for reasons of clarity. FIG. 3 shows the toothed belt 6 after the removal of the "lost core" 16 associated with the central tooth 5.

Figure 4:
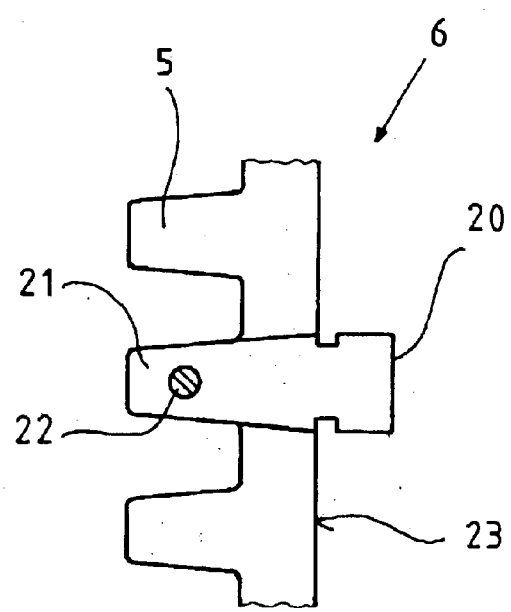
FIG. 4 is a side view of the toothed belt shown in FIG. 3 with an installed fastening element.

FIG. 4 is a side view of the toothed belt 6 in accordance with FIG. 3 after application of a fastening element 20, which offers the possibility of fastening workpiece carriers to the rear side of the toothed belt 6. The fastening element 20 has webs 21 on both sides, which engage in those recesses which have been produced by the webs 18 of the "lost core" 16. The shape of the webs 21 is matched to the shape of the teeth 5 of the toothed belt 6. The webs 21 on both sides of the fastening element 20 are connected together by a screw 22. It will be apparent that the fastening element 20 is held very securely in this manner and is also very precisely fixed in position, particularly if the toothed belt 6 has been ground to size on its rear surface 23. The screw 22 constitutes a predetermined breaking point.

Modifications are of course possible within the scope of the invention. Thus a simple rod-shaped "lost core" can also remain in the toothed belt, in order to counteract the "dish effect". Furthermore, the "lost cores" can have a different configuration to that shown in the drawings. The invention is also applicable to those toothed belts, in which the teeth do not extend over the entire breadth of the toothed belt or are divided into sections, which are offset from one another to define gaps. The material of the "lost cores" is selected in dependence on the desired properties. If the "lost cores" are to be removed, the material should not become bonded with the elastomeric material of the toothed belt.

As regards the material for "lost cores", which are not to remain in the toothed belt, polyester spraying compositions are particularly suitable since they have the necessary brittleness and heat resistance. A material known by the name PBTP is preferably used which has a 25% content of mineral substances.

What is claimed is:

1. Method of manufacturing a toothed belt provided with teeth, wherein a moulding cavity with an inlet and an outlet is defined between a rotating moulding wheel, which is provided in its periphery with an annular channel, which is defined by lateral cheeks and has a base and a breadth and a height, and an endless moulding belt, which also rotates and surrounds a proportion of the periphery of the moulding wheel and engages its lateral cheeks at that point, the moulding wheel being provided in the base of its channel with recesses, the shape of which corresponds to the shape of the teeth of the toothed belt, a mouldable and solidifiable plastic material is introduced into the inlet of the moulding cavity and "lost cores" which extend transversely over the channel from lateral cheek to lateral cheek, are introduced upstream of the inlet of the moulding cavity into the channel in the moulding wheel such that, in at least some of the recesses in the moulding wheel, they are embedded all around in the plastic material of the toothed belt over at least a proportion of their length.

2. Method as claimed in claim 1, wherein the "lost cores" are inserted in the form of rods through openings opposite to one another in the lateral cheeks of the moulding wheel.

3. Method as claimed in claim 1, wherein the "lost cores" are inserted into the moulding cavity and are supported in the recesses in the moulding wheel with at least two respective webs, which extend over the height of the moulding cavity.

4. Method as claimed in claim 3, wherein the "lost cores" are fitted with at least two of their webs into the recesses in the moulding wheel.

5. Method as claimed in claim 3, wherein the "lost cores" are positioned with a respective one of their webs against each lateral cheek of the moulding wheel.

6. Method as claimed in claim 1, wherein the "lost cores" are manufactured from a brittle material, which does not bond with the plastic material of the toothed belt.

7. Method as claimed in claim 3, wherein the "lost cores" are manufactured from a material, whose sliding properties are better than those of the plastic material of the toothed belt.

8. Method as claimed in claim 1, wherein the toothed belt has an untoothed rear surface, which is ground to size after the solidification of the toothed belt.

* * * * *